US011624298B2

(12) United States Patent
Lefebvre

(10) Patent No.: US 11,624,298 B2
(45) Date of Patent: Apr. 11, 2023

(54) TURBINE EXHAUST DRAIN SYSTEM

(71) Applicant: PRATT & WHITNEY CANADA CORP., Longueuil (CA)

(72) Inventor: Guy Lefebvre, St. Bruno de Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 228 days.

(21) Appl. No.: 17/086,741

(22) Filed: Nov. 2, 2020

(65) Prior Publication Data

US 2022/0136410 A1 May 5, 2022

(51) Int. Cl.
*F01D 25/32* (2006.01)
*F01D 25/30* (2006.01)
*F01D 25/00* (2006.01)

(52) U.S. Cl.
CPC .......... *F01D 25/32* (2013.01); *F01D 25/002* (2013.01); *F01D 25/30* (2013.01); *F05D 2220/32* (2013.01); *F05D 2260/602* (2013.01)

(58) Field of Classification Search
CPC ... F01D 25/002; F01D 25/32; F05D 2260/602
See application file for complete search history.

(56) References Cited

U.S. PATENT DOCUMENTS

| | | | | | |
|---|---|---|---|---|---|
| 2,814,931 | A | | 12/1957 | Johnson | |
| 2,949,736 | A | * | 8/1960 | Rubbra | F23R 3/60 60/800 |
| 3,556,444 | A | * | 1/1971 | Kopp | F02C 7/00 244/135 R |
| 8,621,839 | B2 | * | 1/2014 | Alecu | F02C 7/06 60/39.08 |
| 9,903,222 | B2 | | 2/2018 | Rog | |
| 10,017,238 | B2 | * | 7/2018 | Leon | F01D 25/32 |
| 10,167,741 | B2 | * | 1/2019 | Lacko | F01D 25/32 |
| 10,443,448 | B2 | * | 10/2019 | Becoulet | F01D 25/243 |
| 2018/0017025 | A1 | | 7/2018 | Bailey et al. | |

OTHER PUBLICATIONS

European Search Report issued in counterpart application 21206073.5 dated Mar. 30, 2022.

* cited by examiner

*Primary Examiner* — Justin D Seabe
(74) *Attorney, Agent, or Firm* — Norton Rose Fulbright Canada LLP

(57) ABSTRACT

A turbine exhaust drain system has a sump where liquid collects and a suction pipe having an inlet end fluidly connected to the sump and an outlet end fluidly connected to a core gas path of a turbine exhaust case. In use, the combustion gases flowing through the exhaust case creates a venturi effect to draw the liquid from the sump into the core gas path where the liquid and the combustions gases combine into a mixed flow before being discharged through an outlet end of the exhaust case.

18 Claims, 4 Drawing Sheets

TURBINE EXHAUST DRAIN SYSTEM

TECHNICAL FIELD

The application relates generally to gas turbine engines and, more particularly, to a system for draining a sump through the exhaust of the engine.

BACKGROUND OF THE ART

During operation of an aircraft turbine engine a significant volume of air flow through the compressor. Such air, depending on the flight path where the aircraft is operating contains various types of materials such as dirt, corrosive particulates, dust, salt carried in air when flying over ocean bodies, etc. This results in deposits on the blades of the compressor and eventual build-up which has an effect on the performance of the aircraft engine. Accordingly, the compressor must be washed on a regular basis in order to dislodge these deposits. This is typically accomplished by spraying washing and rinsing liquid, such as water into the compressor. The sprayed liquid then flows by gravity from the compressor section to the bottom of the engine where it cumulates in a cavity of the engine hot section module.

There is a need for draining this cavity from such undesirable accumulated liquid.

SUMMARY

In one aspect, there is provided a turbine exhaust drain system for a gas turbine engine, comprising: a sump where liquid collects; an exhaust case having a core gas path passage for discharging a flow of combustion gases received from a turbine section of the gas turbine engine; and a suction pipe having an inlet end fluidly connected to the sump and an outlet end fluidly connected to the core gas path passage, in use, the combustion gases flowing through the exhaust case creating a venturi effect to draw the liquid from the sump into the core gas path passage where the liquid and the combustions gases combine into a mixed flow before being discharged through an outlet end of the exhaust case.

In another aspect, there is provided an engine assembly for an aircraft, comprising: a compressor; a turbine fluidly connected to the compressor, the turbine having a turbine support case; an exhaust case having an upstream end with a first flange securely attached to a second flange at a downstream end of the turbine support case, the exhaust case defining a core gas path passage fluidly connected to the turbine, the exhaust case having an outlet in fluid communication with an environment of the aircraft for discharging combustion gases from the engine assembly into the environment; a sump where liquid collects, the sump having a drain hole extending through the first flange of the exhaust case; and a suction pipe having an inlet end fluidly connected to the drain hole of the sump and an outlet end fluidly connected to a suction port on the exhaust case, the suction port fluidly connected to the core gas path passage.

In another aspect, there is provided a turbine exhaust case for a gas turbine engine, comprising: a radially inner flow boundary wall and a radially outer flow boundary wall defining a core gas path passage for directing a flow of combustion gases; a sump where liquid collects; a hairpin mounting including a flange underneath the sump; a drain hole extending through the flange, the drain hole in fluid communication with the sump; and a suction pipe having an inlet end fluidly connected to the drain hole of the sump and an outlet end fluidly connected to the core gas path passage, wherein, during engine operation, the sump has a pressure P1 and the core gas path passage as a pressure P2, and wherein P2<P1, thereby causing the liquid collected in the sump to be drawn into the core gas path passage before being ejected from the turbine exhaust case together with the flow of combustion gases.

In a further aspect, there is provided a method of draining a cavity at a bottom dead center of a gas turbine engine, the method comprising: fluidly connecting the cavity to a core gas path passage in an exhaust case having an outlet configured to exhaust an engine core flow into the atmosphere; and using the engine core flow as a motive flow to draw liquid collected in the cavity.

According to a still further aspect, there is provided a method of draining a sump in which liquid collects at a bottom of an aircraft engine, the method comprising: fluidly connecting the sump to a core gas path passage of a turbine exhaust case, the turbine exhaust case having an outlet in fluid communication with an environment of the aircraft engine for discharging a flow of combustion gases into the environment, and using the flow of combustion gases as a motive flow to entrain the liquid collected in the sump into the core gas path passage where the liquid combines with the flow of combustion gases before being discharged as a mixed flow through the outlet of the turbine exhaust case.

DESCRIPTION OF THE DRAWINGS

Reference is now made to the accompanying figures in which.

FIG. **2*a*** is a schematic enlarged cross-section view illustrating an optional one-way valve installed in the cavity purge line of the drain system to prevent ingestion of fluid from the exhaust core gas path to the bottom cavity.

Figure 3:
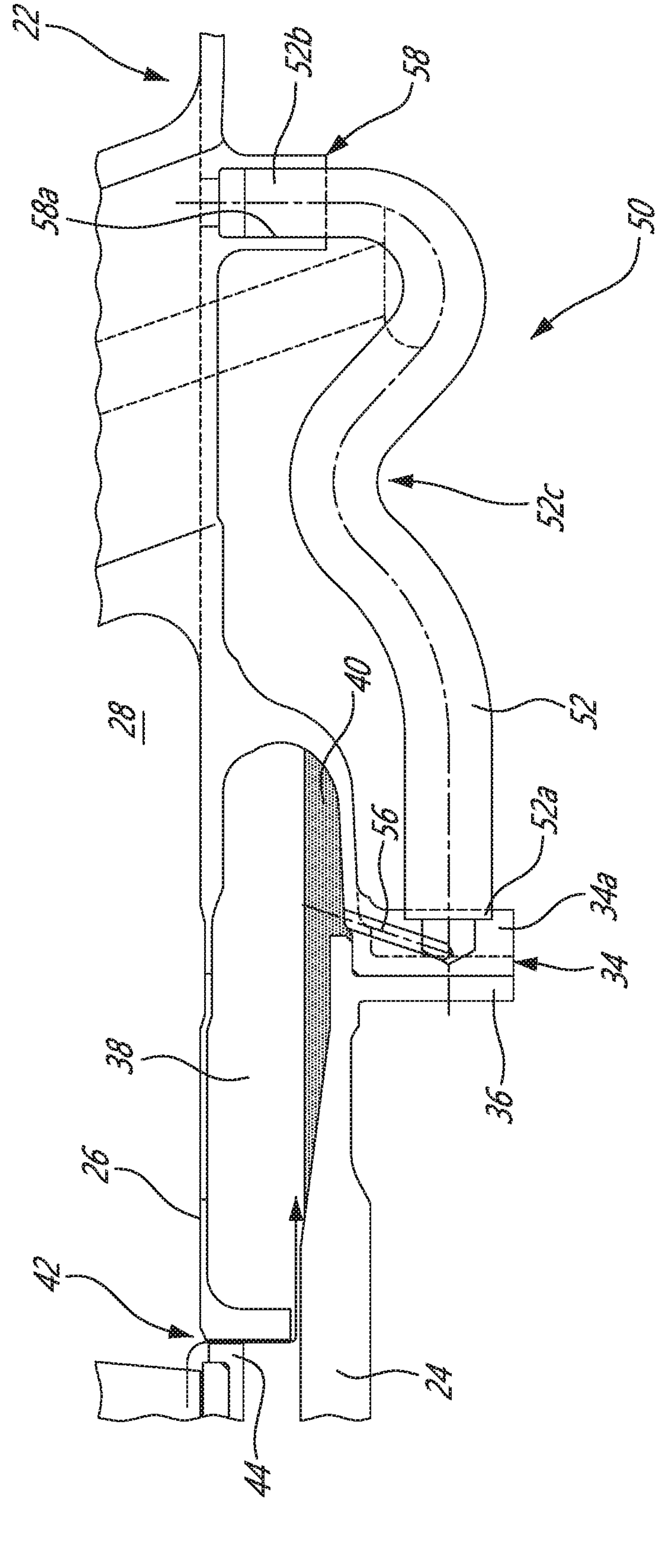
Figure 4:
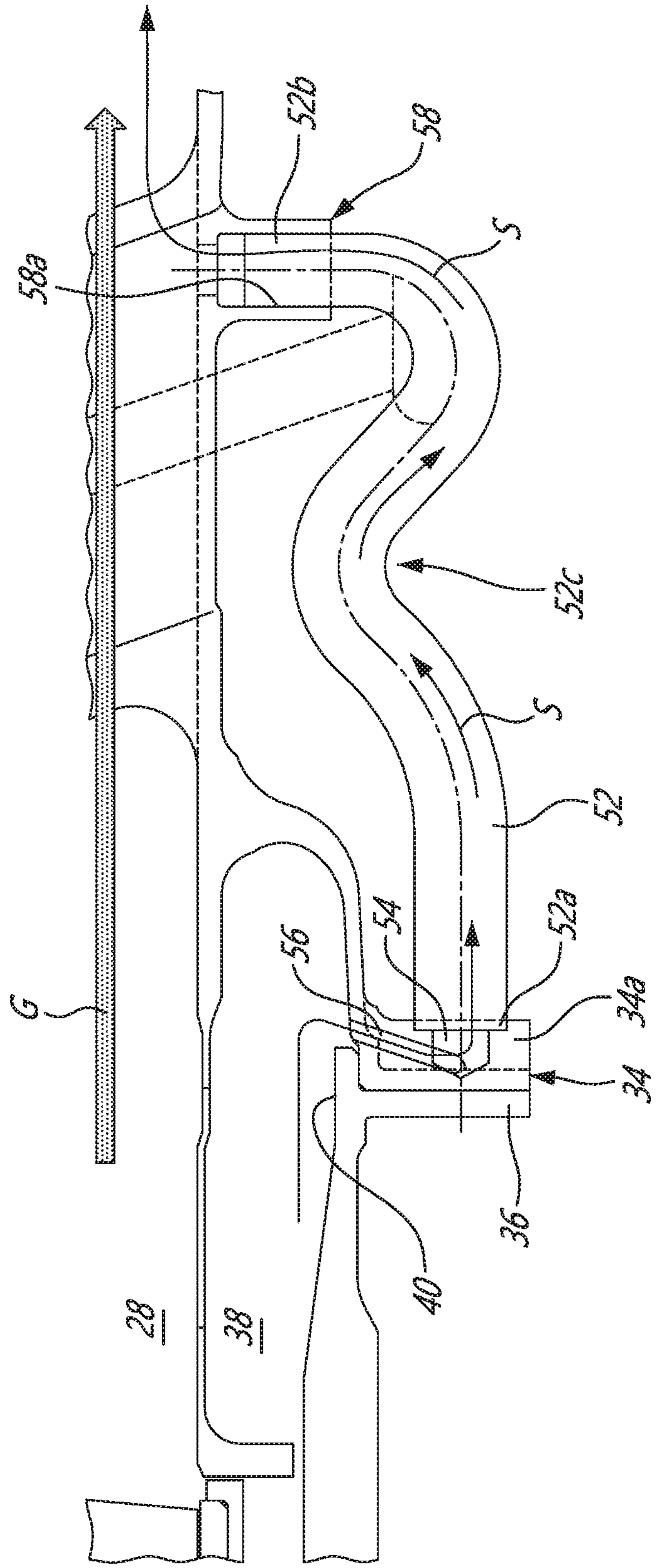

FIG. 3 is a schematic enlarged cross section view illustrating the accumulation of liquid, such as compressor wash liquid, in the engine bottom cavity; and FIG. 4 is a schematic enlarged cross section view illustrating the purging of the cavity through the core gas path of exhaust case.

DETAILED DESCRIPTION

Figure 1:
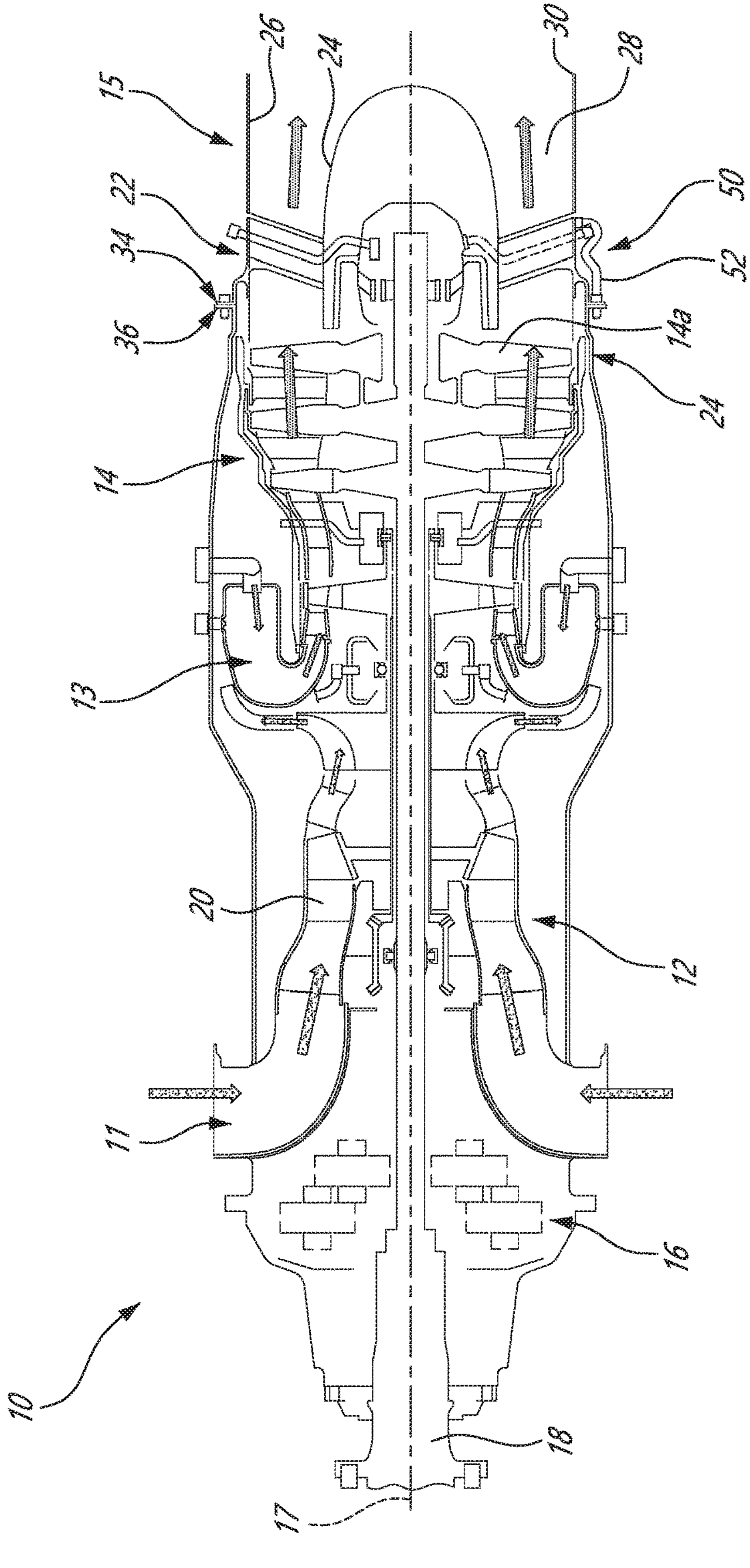
FIG. 1 is a schematic cross section view of a gas turbine engine having an exhaust drain system.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. The turbine 14 includes a low pressure or power turbine **14*a* drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17**.

The gas turbine engine 10 has an axially extending central core which defines an annular core gas path 20 through which gases flow, as depicted by flow arrows in FIG. 1. It is understood that the engine could adopt different configurations, the engine configuration illustrated in FIG. 1 being provided for context purposes only. For instance, the engine could be configured as a turboprop, a turboshaft, a turbofan or an auxiliary power unit (APU) in a through flow or a reverse flow arrangement.

Figure 2:
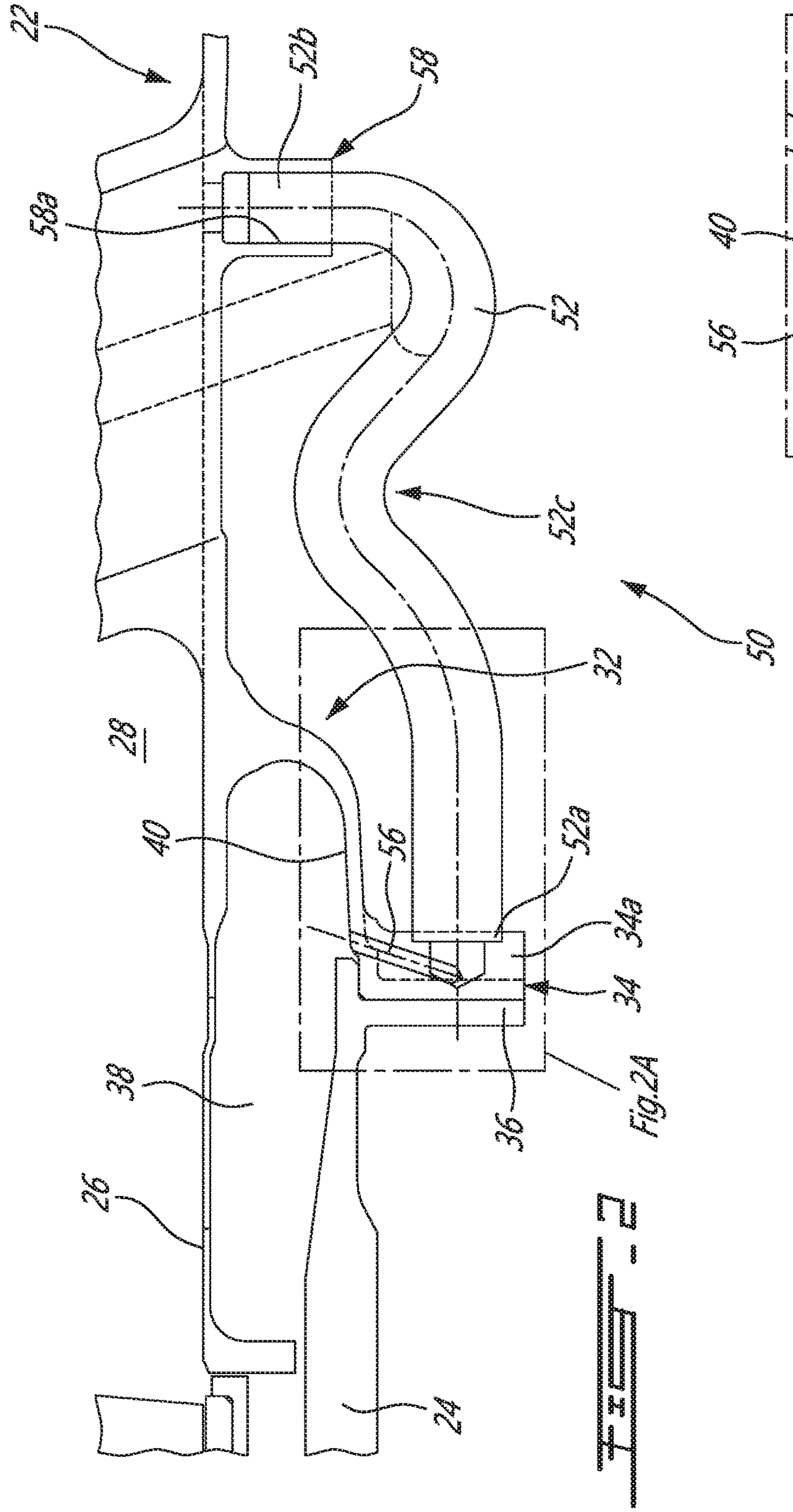
FIG. 2 is a schematic enlarged cross section view illustrating details of the drain system for draining a cavity between the turbine support case and the exhaust case of the engine at a bottom dead center of the engine shown in FIG. 1.

Referring jointly to FIGS. 1 and 2, it can be seen that the exhaust 15 comprises an exhaust case 22 mounted to a downstream end of a turbine support case 24 relative to the core flow through the engine 10. The exhaust case 22 has a radially inner flow boundary wall 24 and a radially outer flow boundary wall 26 defining a core gas path passage 28 forming part of the core gas path 20. The core gas path passage 28 of the exhaust case 22 has an outlet end 30 for discharging combustion gases received from the turbine 14 into the environment of the aircraft engine (i.e. the atmosphere). According to the illustrated embodiment, the exhaust case 22 has an upstream end including an axisymmetric hairpin mounting 32 to accommodate different thermal expansion gradients between the turbine support case 24 and the exhaust case 22 while ensuring the integrity of the core gas path 20. An annular mounting flange 34 projects radially outwardly from an outer leg of the hairpin mounting 32. The exhaust case mounting flange 34 is bolted to a corresponding mounting flange 36 at the downstream end of the turbine support case 24.

As best shown in FIG. 2, the radially outer flow boundary wall 26 of the exhaust case 22 forms part of the inner leg of the hairpin mounting 32 and has an upstream end portion which axially projects into the downstream end portion of the turbine support case 24 so as to form a cavity 38 radially between the inner flow boundary wall 26 of the exhaust case 22 and the downstream end portion of the turbine support case 24. As shown in FIG. 3, the cavity 38 acts as a sump 40 at the bottom dead center of the engine where liquids, such as compressor wash liquid, collect by gravity through the axial gap 42 existing between the inner radially outer flow boundary wall 26 and the adjacent turbine part 44 when the engine 10 is not operated (i.e. absent of thermal expansion).

Referring jointly to FIGS. 2-4, there is shown a turbine exhaust drain system 50 for draining the sump 40. The drain system 50 generally comprises a suction pipe 52 fluidly connected to the sump 40 and the core gas path passage 28 for drawing liquid from the sump 40 using the flow of combustion gases G (FIG. 4) passing through the exhaust case 22 as a motive flow. The suction pipe 52 has an inlet end **52*a* which is brazed or otherwise suitably joined to a port 54 defined in the mounting flange 34 of the exhaust case 22. The thickness of the mounting flange 34 is locally increased to accommodate the port 54 and the connection with the pipe 52. Accordingly, the flange 34 has an extra thickness at a bottom location thereof for connection with the inlet end 52*a* of the suction pipe 52. At least one drain hole 56 is machined or otherwise suitably defined in this thickened bottom portion 34*a* of the mounting flange 34 to fluidly connect the sump 40 to the port 54 and, thus, the inlet end 52*a* of the suction pipe 52. The drain hole(s) 56 extend(s) from the bottom of the sump 40 to the port 54 in the mounting flange 34 of the exhaust case 22. The locally thickened flange 34 allows preserving the symmetry and structural integrity of the hairpin mounting 32 of the exhaust case 22**.

The suction pipe 52 has an outlet end **52*b* brazed or otherwise suitably joined to a boss 58 provided on an outer surface of the exhaust case 22 at a location downstream from the hairpin relative to the flow of combustion gases G through the exhaust case 22. The boss 58 defines a hole 58*a* or suction port which is in fluid communication with the core gas path passage 28 of the exhaust case 22. The outlet end 52*b* of the suction pipe 52 is received in the hole 58*a* of the boss 58 and is, thus, fluidly coupled to the core gas path passage 28 of the exhaust case 22**.

As schematically illustrated in FIGS. 2-4, the length of the suction pipe 52 is selected to accommodate thermal growth between its points of attachment to the mounting flange 34 and the boss 58. The extra length of the pipe 52 may take the form of a curved portion **52*c* giving a serpentine shape to the pipe 52. In use, the curved portion 52*c* of the pipe may straighten up in response to the thermal expansion of the exhaust case 22. Alternatively, a bellows could be formed along a portion of the pipe 52 or a slip joint could be provided. The pipe 52 is made of a heat resistant material offering a desired level of flexibility to accept deformation due to thermal expansion between its points of attachment. For instance, the pipe 52** could be made of an INCONEL alloy (e.g. IN625) or stainless steel.

FIG. 4 illustrates the drain system 50 during a drain or active mode when the gas turbine engine 10 is being operated. In running condition, the suction pipe 52 between the sump 40 and the core gas path passage 28 creates a venturi effect that converts pressure energy of the engine core combustion gases flow G (the motive fluid) to velocity energy to create a low pressure zone in the core gas path passage 28 in the vicinity of the boss 58. The low pressure zone creates a vacuum that draws in and entrains the liquid collected in the sump 40 through the suction pipe 52. That is because the pressure P2 at the boss 58 is less than the pressure P1 in the sump 40. The exhaust flow G (i.e. the combustion gases flowing through the exhaust case) and the suction flow S (i.e. the liquid drawn from the sump 40) combine in the core gasp path passage 28 downstream of the boss 58 to form a mixed flow. The mixed flow is discharged from the exhaust case 22 via the outlet end 30 thereof into the atmosphere.

During the drain mode, any liquid collected in the sump 40 while the engine 10 is not operated, as shown in FIG. 3, is suction from the sump 40 through the suction pipe 52 into the core gas path passage 28 of the exhaust case 22 before being exhausted with the combustion gases. The suction pipe 52 allows the liquid to be withdrawn from the sump 40 without any interaction, moving parts, and/or indication of functionality. No action is required to actuate the drain system 50. Drainage of the sump 40 automatically takes place when the engine 10 is powered and exhaust flow G flows through the core passage 28.

Figure 2A:
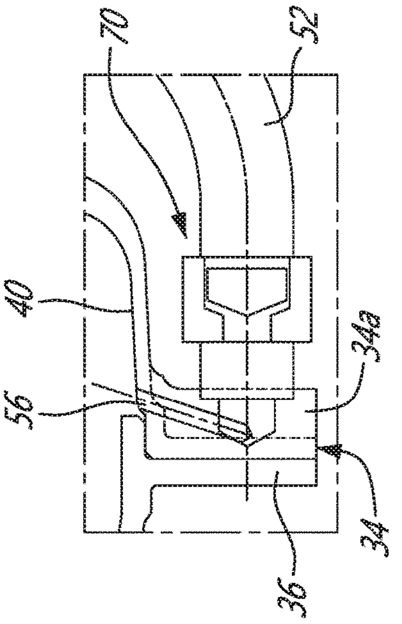

As schematically shown in FIG. **2*a*, a one-way valve 70 (also known as a check valve) may be fluidly connected to the suction pipe 52 to prevent any fluid flow from the core gas path passage 28 to the sump 40. As shown in FIG. 2*a*, the valve 70 may be installed at a pipe connection at the flange interface to allow fluid flow in only one direction along the pipe 52. That is from the sump 40 to the core gas path passage 28. Also, the valve 70 can be designed to open at a predetermined pressure differential between the sump 40 and the core gas path passage 28**. For instance, it could be provided in the form of a spring-loaded ball check valve. However, it is understood that various types of check valves could be used.

According to at least one embodiment, there is provided a scavenge tube design and location, acting as a drain for undesirable accumulated liquid in the hot section module of an aircraft engine. The configuration allows redirecting the liquid into the core gas path of the engine where it is evacuated together with the combustion gases via the engine exhaust. According to some embodiment, this is accomplished by using the flow of combustion gases in the engine exhaust case as a motive flow to draw the liquid accumulated in a bottom cavity of the hot section module using a venturi effect. A suction pipe fluidly connects the cavity where the liquid is collected to an exhaust portion of the core gas path in the exhaust case of the engine downstream of the turbine section. This provides a simple solution to drain undesirable fluid that may accumulate at the bottom of the engine case and that without resorting to an ecology tank. It provides for a compact solution. It contributes to reduce weight and engine complexity.

At least some embodiments thus allow for a compact turbine exhaust design with no external reservoir or tank for collecting undesirable fluid. According to some aspects of those embodiments, a turbine exhaust case draining system can be provided using the engine core exhaust flow as a motive fluid for pumping out any fluid accumulated in a cavity at the bottom of the engine case. This can be achieved without the complexity of tubing connected to an ecology tank or going thru the airframe fuselage.

The embodiments described in this document provide non-limiting examples of possible implementations of the present technology. Upon review of the present disclosure, a person of ordinary skill in the art will recognize that changes may be made to the embodiments described herein without departing from the scope of the present technology. Various modifications could be implemented by a person of ordinary skill in the art in view of the present disclosure, which modifications would be within the scope of the present technology.

The invention claimed is:

1. A turbine exhaust drain system for a gas turbine engine, comprising:
- a sump fluidly connected to a compressor of the gas turbine engine for collecting compressor wash liquid;
- an exhaust case having a core gas path passage for discharging a flow of combustion gases received from a turbine section of the gas turbine engine, the sump fluidly connected to the compressor via an axial gap between an inner radially outer flow boundary wall of the exhaust case and an adjacent turbine part of the turbine section; and
- a suction pipe having an inlet end fluidly connected to the sump and an outlet end fluidly connected to the core gas path passage, in use, the combustion gases flowing through the exhaust case creating a venturi effect to draw the compressor wash liquid from the sump into the core gas path passage where the compressor wash liquid and the combustions gases combine into a mixed flow before being discharged through an outlet end of the exhaust case.

2. The turbine exhaust drain system according to claim 1, wherein the sump is at a bottom portion of a cavity defined radially between the exhaust case and a turbine support case, and wherein the sump has a hairpin mounting, the sump partly defined by the hairpin mounting.

3. The turbine exhaust drain system according to claim 1, wherein the sump has a drain hole defined in a mounting flange of the exhaust case, the inlet end of the suction pipe being joined to the mounting flange and connected in fluid connection to the drain hole.

4. The turbine exhaust drain system according to claim 3, wherein the mounting flange has a bottom portion with a locally increased thickness, and wherein the drain hole is defined in the bottom portion.

5. The turbine exhaust drain system according to claim 3, wherein the outlet end of the suction pipe is engaged with a boss provided on an outer surface of the exhaust case, the boss defining a hole fluidly connected to the core gas path passage.

6. The turbine exhaust drain system according to claim 1 further comprising a one-way valve fluidly connected to the suction pipe and configured to prevent fluid flow from the core gas path passage to the sump.

7. The turbine exhaust drain system according to claim 5, wherein the suction pipe has a length that is greater than a distance between a first point of attachment of the inlet end of the suction pipe to the mounting flange and a second point of attachment of the outlet end of the suction pipe to the boss, the suction pipe having a curved portion along the length thereof.

8. An engine assembly for an aircraft, comprising:
- a compressor;
- a turbine fluidly connected to the compressor, the turbine having a turbine support case;
- an exhaust case having an upstream end with a first flange securely attached to a second flange at a downstream end of the turbine support case, the exhaust case having a hairpin mounting, the first flange provided at an end of an outer leg of the hairpin mounting, the exhaust case defining a core gas path passage fluidly connected to the turbine, the exhaust case having an outlet in fluid communication with an environment of the aircraft for discharging combustion gases from the engine assembly into the environment;
- a sump where liquid collects, the sump having a drain hole extending through the first flange of the exhaust case, wherein the sump is located radially between the turbine support case and the exhaust case, the sump partly defined by the hairpin mounting; and
- a suction pipe having an inlet end fluidly connected to the drain hole of the sump and an outlet end fluidly connected to a suction port on the exhaust case, the suction port fluidly connected to the core gas path passage.

9. The engine assembly according to claim 8, wherein the sump is at a bottom portion of a cavity between the exhaust case and the turbine support case.

10. The engine assembly according to claim 8, wherein the first flange has a bottom portion with a locally increased thickness, and wherein the drain hole is defined in the bottom portion of the first flange.

11. The engine assembly according to claim 8, wherein the suction port is defined in a boss projecting from an outer surface of the exhaust case.

12. The engine assembly according to claim 8 further comprising a one-way valve fluidly connected to the suction pipe and configured to block fluid flow from the core gas path passage to the sump.

13. The engine assembly according to claim 8, wherein the suction pipe has a length that is greater than a distance between a first point of attachment of the inlet end of the suction pipe to the first flange and a second point of attachment of the outlet end of the suction pipe to the suction port.

14. A turbine exhaust case for a gas turbine engine, comprising:

a radially inner flow boundary wall and a radially outer flow boundary wall defining a core gas path passage for directing a flow of combustion gases;

a sump where compressor wash liquid collects;

a hairpin mounting including a flange underneath the sump, the first flange provided at an end of an outer leg of the hairpin mounting, the sump partly defined by the hairpin mounting;

a drain hole extending through the flange, the drain hole in fluid communication with the sump; and a suction pipe having an inlet end fluidly connected to the drain hole of the sump and an outlet end fluidly connected to the core gas path passage, wherein, during engine operation, the sump has a pressure P1 and the core gas path passage as a pressure P2, and wherein P2<P1, thereby causing the compressor wash liquid collected in the sump to be drawn into the core gas path passage before being ejected from the turbine exhaust case together with the flow of combustion gases.

15. The turbine exhaust case according to claim 14, wherein the flange has a bottom portion with a locally increased thickness, and wherein the drain hole is defined in the bottom portion of the flange.

16. The turbine exhaust case according to claim 14, comprising a boss projecting from an outer surface of the exhaust case, the outlet end of the suction pipe connected to the boss.

17. The turbine exhaust case according to claim 16, wherein the boss defines a hole fluidly connected to the core gas path passage, the outlet end of the suction pipe being brazed in the hole of the boss.

18. The turbine exhaust case according to claim 16, wherein a length of the suction pipe is selected to accommodate movement between the flange and the boss when subject to thermal expansion.

* * * * *